United States Patent Office 2,856,851
Patented Oct. 21, 1958

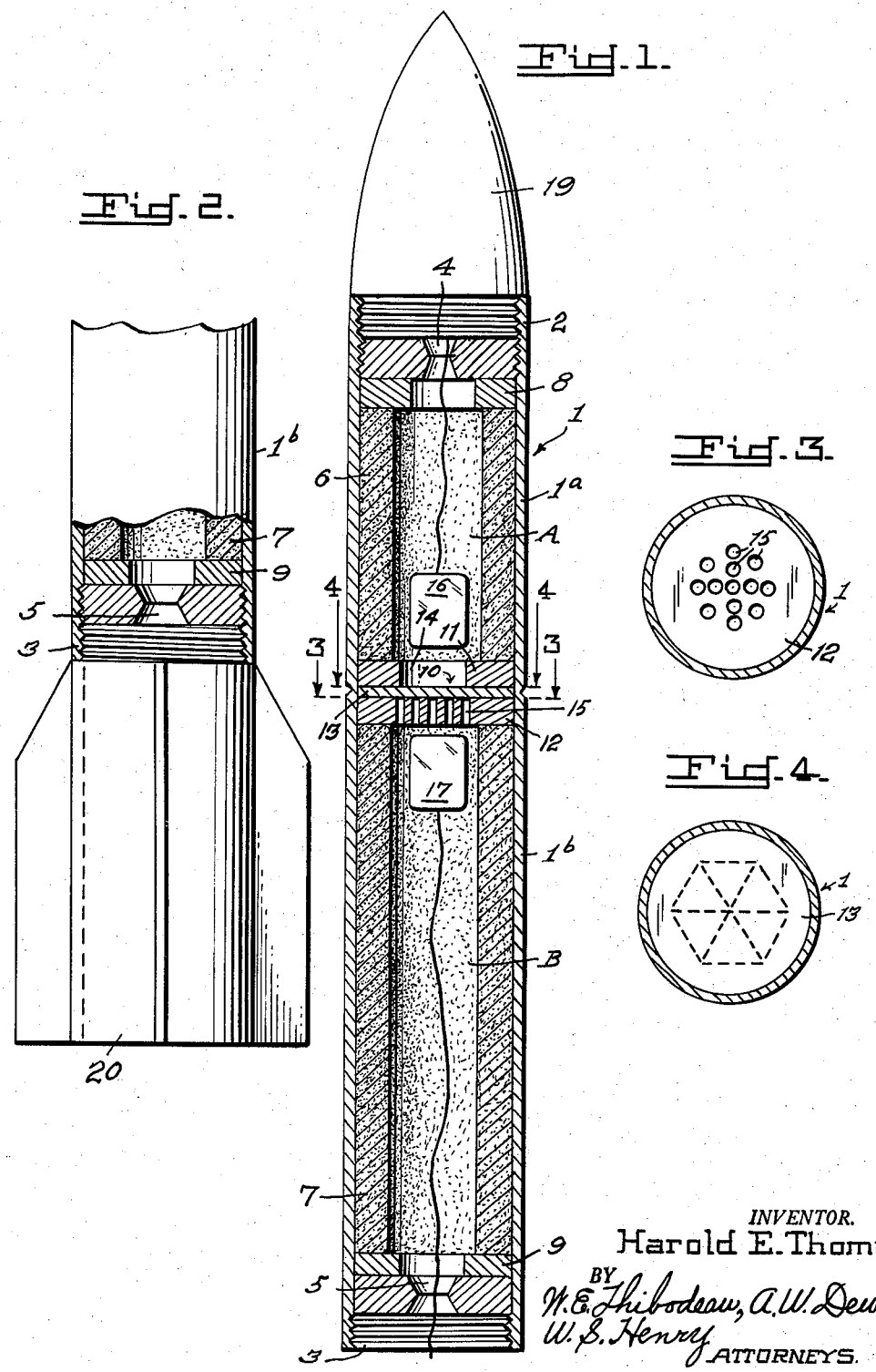

2,856,851
APPARATUS FOR ZONING ROCKETS

Harold E. Thomas, Alexandria, Va., assignor to the United States of America as represented by the Secretary of the Army Application July 27, 1955, Serial No. 524,833

9 Claims. (Cl. 102—49)

(Granted under Title 35, U. S. Code (1952), sec. 266)

The invention described herein may be manufactured by or for the Government for governmental purposes without the payment to me of any royalty thereon.

This invention relates to a duo-range rocket to which a warhead may be attached at either end of the motor housing, and in particular to the zoning of the rocket propellant or combustion chamber.

Modern warfare has demonstrated the need for a versatile rocket that may be used with a variety of warheads, for example, an armor-piercing warhead or an anti-personnel warhead attachable in the field, as well as a variety of ranges to provide the proper trajectory for the warhead used. In anti-tank warfare the rocket preferably has a long range, say 2000 yards, and a relatively flat trajectory. However, to be effective as an anti-personnel projectile at close range, the rocket should have a short range and a relatively high but short trajectory. It is obvious that a long range rocket would be inaccurate under the latter circumstances due to the length of its trajectory when used in a manner similar to a mortar projectile. It is also obvious that a rocket having an anti-personnel warhead should hit the target at a high angle of elevation if the fragmentary pattern of the warhead is to cover the maximum area and the optimum generally circular pattern.

In the past rockets have been manufactured, assembled and shipped to the field for use against one type of target such as a tank. To make such a rocket effective as an anti-personnel projectile the warhead must be changed from an armor-piercing type to anti-personnel type and the rocket equipped with a time fuze, or some other means must be used, to change the rocket's range so that its trajectory is suitable for the type of warhead used.

The rocket of this invention is particularly, and conveniently, adapted as an anti-tank projectile and as an anti-personnel projectile since the rocket motor is equipped with a fire wall, or zoning partition which varies the rocket's range by allowing all the fuel to be burned for long range and only part of the fuel burned for lesser ranges. This is accomplished by providing a rocket motor in which a solid fuel propellant is housed and divided into two chambers. Each chamber has either an equal amount of fuel or one chamber may have less propellant than the other. The fuel is separated and sealed off within the chambers by a zoning wall which is impervious from one side and pervious from the other side. In this way the fuel in the chamber adjacent the impervious side of the zoning wall may be ignited and burned without burning the fuel in the other chamber, to give a short range for the rocket. When the fuel is ignited in the chamber adjacent the pervious side of the zoning wall the fuel in both chambers is burned to give the rocket a long range.

This type of zoning can also be employed without a "one way" impervious zoning wall. In other words a "two way" impervious zoning wall could be used to provide one motor chamber with a fuel grain suitable for one range and a second motor chamber, sealed from said first chamber, with a second fuel grain suitable for a second range. However the preferred method of zoning rocket propellants is to provide a "one way" impervious zoning wall so that all the fuel is utilized for long range operation of the rocket.

One of the outstanding features of the rocket of this invention is its ability, in hilly terrain, of being used in a manner similar to that of a mortar because of its duo-range capacities. With this rocket the far side of a hill may be brought under fire at close range with a high degree of accuracy since a long range rocket would have too great a trajectory for any degree of accuracy under these conditions, whereas this rocket can be "lobbed" over the crest of a hill.

Accordingly it is one object of this invention to provide a duo-range rocket motor.

Another object of this invention is to provide a rocket motor having means to zone the propellant therein.

Another object of this invention is to provide a rocket motor having means to zone the combustion chamber into two discrete combustion chambers, one of which may be used alone or both chambers may be used together.

Another object of this invention is to provide a zoning wall for a combustion chamber which is impervious to gas pressure generated on one side thereof and pervious to pressure generated on the other side thereof.

Another object of this invention is to provide a rocket motor housing having two discrete combustion chambers therein and an exhaust nozzle for each chamber at each end of said housing, wherein propelling gases are expelled from one end of the housing when only one chamber is utilized, for short ranges, and from the opposite end of the housing when both chambers are utilized, for long ranges, and in which the warhead is attached at either end of said housing depending on the range selected.

Another object of this invention is to provide a duo-range rocket to which a warhead is attached at either end of the rocket motor housing.

The specific nature of the invention and other objects and advantages will appear from a preferred embodiment as shown in the accompanying drawings in which:

Fig. 1 is a longitudinal sectional view of rocket projectile embodying this invention.

Fig. 2 is a partial view in section showing stabilizing fins attached to one end of the rocket.

Fig. 3 is a sectional view of the rocket of Fig. 1 on lines 3—3 showing an intertrap with a plurality of small openings.

Fig. 4 illustrates a diaphragm having score lines thereon to provide a folding action upon rupture.

In Fig. 1 there is shown in assembled relation a rocket projectile embodying this invention. The projectile comprises a hollow rocket motor housing 1, both ends of which are internally threaded as at 2 and 3 to facilitate attachment of the warhead 19 at either end of the housing 1. Any other suitable means may also be used. Nozzles 4 and 5 are fixed in the housing 1 at both ends thereof. Nozzle 4 has a smaller opening suitable for its combustion chamber size as is well known in the art. As shown at the upper portion of Fig. 1, when the warhead is attached, the nozzle at that end is sealed off. When the rocket is fin stablized, fins 20 are attached to the opposite end of the rocket housing as shown in Fig. 2. If the projectile is spin stabilized a nozzle plate is substituted for the nozzles 4 and 5, each nozzle plate (not shown) containing several canted nozzles as is well known.

Fuel grains 6 and 7 are glued, or otherwise attached to the inner walls of the housing sections 1a and 1b and spaced from the end nozzles 4 and 5 by end traps 8 and 9. The central longitudinal opening of each fuel grain defines a combustion chamber. The short fuel grain 6 defining a small combustion chamber A and the long fuel grain defining a larger combustion chamber B. The size of each grain and its combustion chamber is selected for a suitable short range (fuel grain 6) and a long range (fuel grains 6 and 7).

The fuel grains 6 and 7 are shown as hollow cylindrical grains, however, a plurality of solid cylindrical grains may also be used in place of the fuel grains shown as is well known in the art, and necessitating only minor obvious changes.

Between fuel grains 6 and 7 is a "one way" impervious zoning wall generally designated as element 10.

The zoning wall 10 comprises a pair of intertraps 11 and 12 having a sealing diaphragm 13 therebetween. One intertrap, 11, has a large central opening 14 and the other intertrap 12 has a plurality of small openings 15. The sealing diaphragm 13 is preferably of thin steel, weakened by scoring, or other suitable means, so that it is ruptured by pressures built up in chamber B when consumable squib 17 in the chamber fires the fuel grain 7. When diaphragm 13 ruptures the crimp like portions of the diaphragm are folded into the opening 14, to thereby prevent fragmenting and consequent possible damage to the propellent grain. The crimp like portions of the diaphragm will be held against the walls of the opening 14 by pressure. The opening may be of any desirable shape, i. e. round, square etc. The rupturing of diaphragm 13 allows the hot gases in chamber B to enter chamber A and ignite the fuel grain 6 directly and also fire the consumable squib 16 in chamber A.

The intertraps 11 and 12, and the end traps 8 and 9 are rigidly supported by the motor housing 1.

The housing 1 is divided into sections 1a and 1b, joined at a point adjacent the zoning wall 10 by welding, or other production techniques, to allow assembly of zoning wall 10.

The combustion chambers A and B each have a suitable consumable igniter therein such as squibs 16 and 17. The position of the squibs 16 and 17 is preferably as shown in Fig. 1, however they may be placed in other positions within the chambers A and B.

Due to the short burning time of the fuel in this rocket no insulation is required for the warhead or at the zoning wall 10. However if longer burning times are desirable, insulation, such as asbestos, or an air space may be used to insulate the warhead and interwall.

It is noted that the openings in the intertraps 11 and 12 must be large enough to sufficiently vent the gases from motor A through exit nozzle 5 when both motors are used for long ranges. As is well known in the art, the area of the openings through the intertraps will be, generally, at least twice the area of the exhaust nozzle 5. Theoretically the area of the large opening 14 will be equal to the area of the plurality of openings 15. However, in practice, the area of the opening 14 is greater than the total area of the openings 15 since the area between the openings 15 in intertrap 12 must be taken into consideration in determining the area of opening 14. Also to be considered is that the diaphragm 13 will be ruptured into the opening 14 when both motors are to be used for long range operation.

In operation for short ranges a suitable warhead is attached at threaded end 3, and if the rocket is fin stabilized, fins are attached at threaded end 2, and the rocket placed in a launcher. The squib 16 is fired burning fuel grain 6. Fuel grain 7 in chamber B is not ignited because the hot gases from chamber A do not pass through zoning wall 10. The gas pressure generated in chamber A does not rupture the diaphragm 13 because the diaphragm is being pressed against the intertrap 12 in which the openings are small and the pressure is not great enough to force the diaphragm into this small area. However when the squib 17 is fired and the fuel grain 7 ignited, the pressure generated in chamber B is sufficient to rupture diaphragm 13 because of the large opening 14 in intertrap 11. In this way the hot gases from chamber B travel into chamber A igniting the fuel grain 6 directly and also firing the squib 16 to facilitate burning grain 6. When both chambers are utilized as in the former instance the rocket will have a maximum range and can be fitted with a suitable warhead.

The term "one way" impervious zoning wall used throughout the specification and claims is defined as a wall impervious to the passage of gas under pressure in one direction and pervious to the passage of gas under pressure in the opposite direction.

Many modifications will be apparent to those skilled in the art, and the invention is therefore, not limited to the embodiment shown for illustrative purpose, but limited only within the scope of the appended claims.

I claim:

1. In a duo-range rocket motor a zoning wall forming a first and second axially aligned discrete combustion chamber, a predetermined quantity of solid propellant operatively associated with each of said combustion chambers, separate ignition means for each said solid propellant, oppositely directed exhaust nozzle means associated with each said combustion chamber and disposed at opposite ends of said motor, the throat area of one said nozzle designed to exhaust the gases from one said combustion chamber and the throat area of the other said nozzle designed to exhaust gases from both said combustion chambers, said zoning wall rupturable by pressure in only one of said combustion chambers whereby one or both said propellant grains may be utilized for propulsion.

2. In a duo-range rocket the combination comprising a rocket motor housing, first and second fuel grains axially aligned within said housing and defining first and second combustion chambers, a zoning wall separating said first and second grains, said wall being rupturable by gas pressure generated in only one of said combustion chambers, a nozzle fixed at each end of said housing for each of said first and second combustion chambers, and means to attach a warhead at either end of said housing.

3. In a duo-range rocket motor, a rocket motor housing, first and second fuel grains in axial spaced relation in said housing, zoning means for said fuel grains comprising a first and second intertrap separating said fuel grains, a diaphragm between said intertraps and integral therewith, said first intertrap having a large central opening therethrough and said second intertrap having a plurality of smaller openings therethrough aligned with said large opening, said large opening having a greater area than the total area of said small openings, said diaphragm being rupturable into said large opening by gas pressure acting on said diaphragm through said small openings.

4. A rocket motor as in claim 3, said diaphragm having score lines to provide folding areas upon rupture of said diaphragm.

5. In a duo-range rocket motor, a zoning wall, a first and second discrete solid fuel grain therein, said zoning wall separating said first and second fuel grain and defining a first and second combustion chamber therewith, said wall comprising a first and second intertrap having a diaphragm therebetween and abutting said first and second intertrap, one said intertrap having a single opening therethrough and the other said intertrap having a plurality of openings therethrough aligned with said single opening, said single opening having a greater area than said plurality of openings, said diaphragm being rupturable only into said single opening by gas pressure generated in the combustion chamber adjacent the intertrap having the plurality of openings.

6. In a duo-range rocket the combination comprising a rocket motor housing, first and second hollow cylindrical solid fuel grains axially aligned within said housing and defining first and second combustion chambers, a zoning wall separating said first and second grains, said wall being ruptured by gas pressure generated only in one of said combustion chambers, a nozzle fixed at each end of said housing for each of said first and second combustion chambers, and means to attach a warhead at either end of said housing.

7. A duo-range rocket having a rocket motor housing, a first and second axially aligned hollow cylindrical solid fuel grain fixed within said housing and defining a first and second combustion chamber, a zoning wall separating said first and second combustion chamber, said wall being impervious to gas pressure generated in one said chamber and ruptured by gas pressure in the other said chamber to connect said first and second chamber, a nozzle fixed to each end of said housing for each of said combustion chambers, means to attach a warhead at either end of said housing, and separate ignition means for each said first and second fuel grain.

8. A duo-range rocket having a rocket motor housing, a first and second axially aligned solid fuel grain fixed within said housing, a nozzle fixed to each end of said housing for each of said combustion chambers, a zoning wall separating said first and second fuel grains and defining discrete first and second combustion chamber therewith, said wall comprising a pair of intertraps abutting said first and second fuel grain and rigidly supported by said housing, a thin metal diaphragm between said intertraps and contiguous therewith, one said intertrap having a single opening therethrough and the other said intertrap having a plurality of openings therethrough aligned with said single opening and having an aggregate area substantially equal to the area of the throat of the corresponding exhaust nozzle, said diaphrapm rupturable only into said single opening by gas pressure generated in one of said chambers and acting on said diaphragm through said plurality to connect said first and second chamber, separate ignition means for each said first and second fuel grain, and means to attach a warhead to either end of said housing.

9. In a duo-range rocket, a rocket motor housing, a first and second axially aligned solid fuel grain fixed within said housing, an impervious zoning wall separating said first and second fuel grains and defining discrete first and second combustion chambers in said housing, a nozzle fixed at each end of said housing, adjacent the remote ends of the respective grains for each of said combustion chambers, separate ignition means for said first and second fuel grains, respectively, and means to attach a warhead at either end of said housing to thereby select one of said rocket ranges.

References Cited in the file of this patent

UNITED STATES PATENTS 961,179   Unge ------------------ June 14, 1910

FOREIGN PATENTS 379,664   Italy ------------------ Apr. 2, 1940